Feb. 21, 1961     J. D. VOSKRESENSKI     2,972,158
PAINT APPLICATOR
Filed March 26, 1957
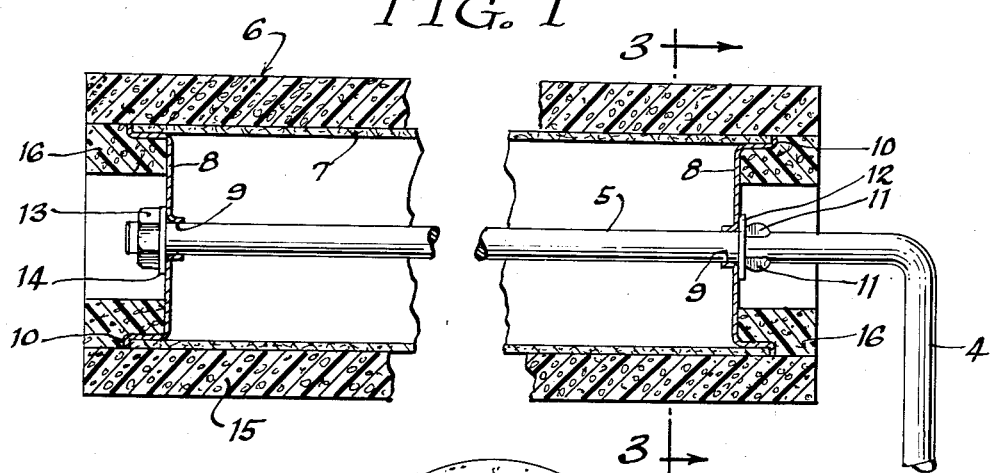
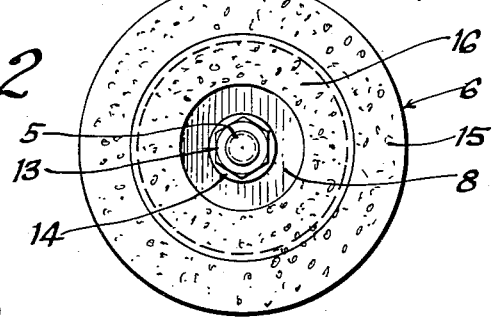
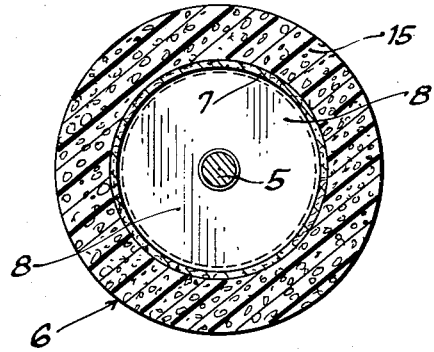
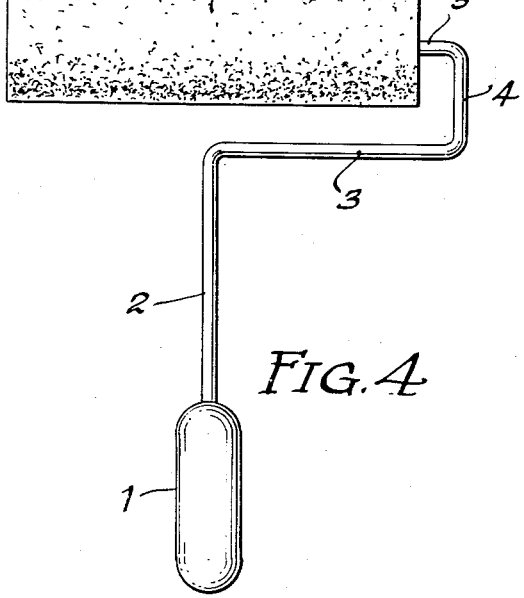
INVENTOR.
Jacob D. Voskresenski
BY J. Warren McCaffrey
Attorney

United States Patent Office 2,972,158
Patented Feb. 21, 1961

2,972,158

PAINT APPLICATOR

Jacob D. Voskresenski, 914 N. Homan Ave., Chicago 51, Ill.

Filed Mar. 26, 1957, Ser. No. 648,642

4 Claims. (Cl. 15—244)

This invention relates to a new means for applying fluid coating materials to flat surfaces.

It relates especially to a paint applicator of the roller-type and is a further improvement on my pending applications, Serial Numbers 624,268 and 638,629 both of which are now abandoned.

In my previous applications I described roller applicators that were constructed specially to paint flat surfaces that meet to form a corner. They were designed so that the operator in moving the applicator along one surface at the junction of the two surfaces would simultaneously coat that one surface, the corner junction, and also the other surface forming the corner, with paint from one dip into the tray of paint. Thus the use of either device provided a uniform application of coating material in a minimum time by doing two surfaces and a joint at a corner formed by the two surfaces in one stroke of the applicator.

That is the object of this invention also, but I have now designed an applicator that is simpler in construction and far more practical. And on testing I find that it applies a coat of paint more uniformly.

It is also an object of this invention to cover the roller with sponge rubber or sponge plastic instead of a long nap or high pile fabric because the sponge rubber and sponge plastic materials have a longer life and stand up better for repeated use than any long nap or high pile fabric I know of.

I have experimented with sponge rubber, foam rubber, foam plastic, foam vinyl and foam polyurethane and find that foam plastic, that is a foam made from a plastic material like plasticol, makes the best medium for applying paint upon a flat surface. In addition I have found that a roller covered with plastic foam stands up very well when used with different kinds of coating and cleansing materials, whereas wool or any long nap or high pile fabric will only permit a limited use of the roller applicator with certain painting and cleansing materials.

It is a further object of this invention to have the plastic foam around the roller to extend a little beyond the ends of the roller so that it will yieldably fit into the corner formed by the two surfaces being painted. The plastic foam extends beyond the roller at both ends because the roller may be mounted on the extension of the handle which constitutes the axle for the roller with either end of the roller at the distant end of the axle, or at the end of the axle that bends into the handle portion of the applicator. Thus when the roller is dismounted from the axle for cleaning or changing of the plastic foam sheath, it may be freely remounted on the axle with no attention given to which end of the roller is at which end of the axle.

Another important feature of the device of this invention is the use of a plastic foam sheath that is circular, open at both ends and having an inside diameter slightly smaller than the outside diameter of the roller. This enables the foam plastic to be stretched slightly, when fitting it onto the roller from either end, and the contraction after stretching causes the plastic to hug the roller tight. Foam plastics and vinyls have stretching qualities like rubber. To further secure it to the roller I apply a little glue to the edge of the face of the roller and the foam plastic sticks to the roller tenaciously.

Having described some of the features of my latest paint applicator I would like to direct attention to the accompanying drawings wherein—

Figure 1 is a vertical sectional view through the roller to the front side of the axle.

Figure 2 is a vertical view of the left end of the roller mounted on the distant end of the combination axle and handle of the applicator without the plastic ring glued into the cap.

Figure 3 is a vertical sectional view through the roller along the line 3—3 of Figure 1.

Figure 4 illustrates the assembled applicator ready for use.

Referring to Figure 4 first so as to name and locate the different members of the applicator of this invention I have designated the hand grip as 1 and the straight extension of the handle as 2. In order to bring the roller crosswise of the handle at about the center of the roller the handle rod 2 is bent at a right angle to form shoulder section 3 and bent again at a right angle in an opposite direction to form extension 4.

It should be understood that the length of sections 2, 3 and 4, nor the direction and size of the angles in which the combination rod which serves as axle and handle may be bent is no part of my invention. My object is to make construction simple so as to reach into the corner and paint the adjoining walls.

The distant end of the combination rod serving as handle and axle may be bent at a right angle to section 4 so as to provide axle 5 on which the roller 6 is mounted. Any different length of sections and angular bends would be equally effective as long as the roller crosses the handle at right angles at approximately the center plane of the roller so that the operator can apply pressure to the roller while handling a tool that is approximately balanced in his hand.

The construction of roller 6 can best be understood by studying Figure 1 wherein a roller 7 of cardboard or any other stiff and lightweight material is shown mounted on axle 5 by means of identical caps 8. Caps 8 are shaped out of lightweight metal or stiff cardboard with central holes 9 and outwardly extending annular flanges 10 as shown. The caps are press-fitted into the opposite ends of the tubular roller 7 until the outwardly extending annular flanges 10 come to rest against the edges of the metal or cardboard roller 7 as shown. Axle 5 is inserted through the holes in caps 8 up to approximately the upset nobs 11. Sufficient leeway is allowed for the insertion of washer 12 which facilitates the rotation of the roller. At the other end of axle 5 the roller is held on the axle by means of a nut 13 and an intervening washer 14 which also facilitates rotation of the roller. The adjustment of nut 13 will control the distance between washers 12 and 14 and also will control the ease of rotating roller 7. The roller must rotate freely and continuously when moved by the operator over a flat surface—it cannot be allowed to slide or drag without affecting the uniform application of paint to the surface.

The foam rubber or foam plastic to cover the roller 7 is first molded into a cylindrical shape with an inside diameter a little smaller than the outside diameter of roller 7. The cylinder of foam plastic 15 is cut into a length slightly longer than roller 7 so that it may extend beyond the end of the roller at each end a short distance. Then the cylinder or sheath of foam plastic or foam rubber is stretched to increase its diameter enough so that it may be slipped over the cardboard roller 7. When the sheath of foam plastic is properly located around the roller the stretching is released and the sheath hugs the roller tightly by reason of the contraction of the diameter of the sheath. However, to secure it still better to the roller a little glue may be added to the face of the roller at its two ends before the aforesaid stretching is released. Thus when the stretching is released the foam plastic will hug the roller and also will be glued thereto at the two ends.

Finally a ring or collar 16 of the same foam plastic or foam rubber material as envelops roller 7 is glued into the outside face of each cap 8. Preferably the ring has an outside diameter equal to the inside diameter of the foam plastic sheath 15 and an inside diameter large enough to permit the operator access to the nut 13 and washer 14. The ring 16 may also have its outside circumference glued to the inside wall of sheath 15 which extends beyond the ends of roller 7. The purpose of these rings is to support the ends of the sheath that extend beyond the ends of the roller when pressing the roller into a corner and also to cover the ends of the roller as much as possible so as to provide appreciable applicating surface of the same foam plastic material for simultaneously applying paint to the adjoining wall surface. Rings also have to be used at the ends of the roller so as to permit the insertion of axle 5.

What I claim as invention follows:

1. A paint applicator of the roller type comprising a rod one end of which serves as a handle to the device and the other end of which serves as an axle for the roller of the device, a hollow cylinder centrally journaled on said axle by means of identical caps with central holes rotatably receiving said axle press-fitted into the ends of said cylinder, a covering of plastic foam around the cylindrical outer surface of said cylinder, said covering extending equal distances beyond each end of said cylinder and terminating abruptly with annular end faces of said plastic foam covering at right angles to the axis of said cylinder, and a ring of the same plastic foam material glued into each of the outside faces of said mounting caps of such thickness that the outside end faces of said rings are aligned flush with the ends of said plastic foam covering.

2. A paint applicator of the roller type comprising a rod, one end of which serves as a handle while the other end serves as an axle, a cylindrical hollow roller mounted on said axle by identical caps with central openings rotatably receiving said axle, which caps are pressed into the opposite ends of said roller, a tube of plastic foam material stretch-fitted around said roller, said tube of plastic foam extending beyond the ends of said roller equal substantial distances and terminating with the annular end faces of the tube of plastic foam intersecting the outer surface of said tube at right angles, and preformed rings of the same plastic foam material secured in opposite ends of said tube of plastic foam up against the outside faces of said identical caps so that the outer end faces of the ring inserts are at right angles to the central axis of said plastic tube.

3. A paint applicator of the roller type comprising a rod with hand gripping means at one end and the other end bent at right angles to the handle end serving as the axle for a roller, said roller being a hollow tube that has identical circular caps press fitted into each end of said hollow tube, said circular caps having central holes receiving said axle end of said rod therethrough, said roller being rotatable on said axle between upset nobs and a washer at one end of said axle and a nut and washer at the distant end of said axle, said roller having a cylindrical covering of polyeurethane foam which is stretch fitted on said roller, said cylindrical covering being much thicker than said roller and extending equal distances beyond the ends of said roller, said cylindrical covering terminating at each end in annular rings whose faces are at right angles to the outer cylindrical surface of said cylindrical covering, preshaped rings of polyeurethane foam inserted inside said annular rings and secured therein so that the outside faces of said annular rings and said inserted rings are in the same plane.

4. A paint applicator as defined in claim 3 in which said preshaped rings of polyeurethane foam are inserted inside said annular rings and secured by adhesive means to said annular rings and the exterior faces of said identical caps.

References Cited in the file of this patent

UNITED STATES PATENTS

| | | |
|---|---|---|
| 2,378,900 | Adams | June 26, 1945 |
| 2,434,462 | Kempthorne | Jan. 13, 1948 |
| 2,478,318 | Raub | Aug. 9, 1949 |
| 2,591,530 | Findley et al. | Apr. 1, 1952 |
| 2,645,845 | Vengris | July 21, 1953 |
| 2,722,030 | Van Clief | Nov. 1, 1955 |
| 2,810,924 | Slingluff | Oct. 29, 1958 |

FOREIGN PATENTS

| | | |
|---|---|---|
| 215,009 | Australia | Nov. 15, 1956 |
| 1,035,235 | France | Apr. 15, 1953 |